United States Patent
Aratani

[19]

[11] Patent Number: 6,030,678
[45] Date of Patent: Feb. 29, 2000

[54] MULTI-LAYER OPTICAL DISK

[75] Inventor: Katsuhisa Aratani, Chiba, Japan

[73] Assignee: Sony Corporation, Tokyo, Japan

[21] Appl. No.: 09/100,710

[22] Filed: Jun. 19, 1998

[30] Foreign Application Priority Data

Jun. 20, 1997 [JP] Japan ...................................... 9-164457

[51] Int. Cl.$^7$ ....................................................... B32B 3/00
[52] U.S. Cl. ........................ 428/64.1; 428/64.2; 428/64.4; 428/702; 428/913; 430/270.12; 430/495.1; 430/945; 369/283; 369/288
[58] Field of Search ................................. 428/64.1, 64.2, 428/64.4, 698, 702, 913; 430/270.12, 495.1, 945; 369/283, 288

[56] References Cited

U.S. PATENT DOCUMENTS

| | | | |
|---|---|---|---|
| 5,761,187 | 6/1998 | Kaneko et al. | 369/275.1 |
| 5,766,717 | 6/1998 | Kaneko et al. | 428/64.1 |
| 5,817,389 | 10/1998 | Ono | 428/64.1 |

FOREIGN PATENT DOCUMENTS

| | | |
|---|---|---|
| 0 514 211 A1 | 11/1992 | European Pat. Off. . |
| 0 520 619 A1 | 12/1992 | European Pat. Off. . |
| 0 745 985 A2 | 12/1996 | European Pat. Off. . |
| WO 96/31875 | 10/1996 | WIPO . |
| WO 97/09716 | 3/1997 | WIPO . |

*Primary Examiner*—Elizabeth Evans
*Attorney, Agent, or Firm*—Frommer Lawrence & Haug, LLP.; William S. Frommer

[57] ABSTRACT

In a multi-layer optical disk having a first information layer and a second information layer, reproduction of a more excellent quality is made possible. To this end, there is provided a structure wherein the first information layer and the second information layer are laminated to form a sheet of the optical disk. Then, the first information layer has a metal reflecting film with a reflection factor of more than 90% relative to a first reproduction light with a wavelength range of 770 nm~830 nm and the second information layer is so structured to have a semi-transparent reflection film wherein a ratio $ns_2/ns_1$ between respective real number portions of a refractive index $ns_1$ against the above mentioned first reproduction light and a refractive index $ns_2$ relative to a second reproduction light with a wavelength range of 615 nm~655 nm is more than 1.05.

12 Claims, 3 Drawing Sheets

MULTI-LAYER OPTICAL DISK

BACKGROUND OF THE INVENTION

The present invention relates to a multi-layer optical disk, particularly, to an optical disk formed into one sheet of a disk by piling up two layers of an information layer.

In recent years, such a demand that information recording media deal with a large capacity of information is increased, and in that case, too, a need for an optical disk of a large capacity is rising in order to be able to random-access and reproduce a target information.

As an optical disk capable of dealing with such information of a large capacity, there has been a proposal of a multi-layer disk or that of an optical disk formed as one sheet of a disk, especially, in which two information layers are piled up, that is, laminated.

Various kinds of the multi-layer disk have been proposed, and for one of them, there is a proposal of a multi-layer disk which is formed of a first information layer coated with a metal reflecting film and a second information layer coated with a semi-transparent reflection film whose spectroscopic characteristics such as a reflection factor, a transmission factor and the like have a wavelength dependency, and which is made to read out information from the first and the second information layers by using first and second reproduction lights of two different wavelengths (refer to a public bulletin for Japanese laid-open patent publication No 2-223030 and one for Japanese laid-open patent publication No 8-339574).

In the multi-layer optical disk having the first and the second information layers for carrying out a playback of the information by using the first and the second reproduction light, there is proposed a structure wherein, although the multi-layer optical disk is structured so that the playback is made possible by a reproduction light, for example, as the first reproduction light, which is within a wavelength range in a playback player for a conventional general purpose compact disk (CD) aimed exclusively for, for example, the playback, the playback is made possible with the same playback player of a conventional CD as for the other information layer.

The optical disk laminated with the first and the second information layers is, for example, as shown in a schematic cross-sectional view of one example thereof in FIG. 1, such that a first information layer 4f made up of a first information pit 2f formed on a surface of, for example, a first light transmission substrate 1f and a metal reflection film 3f coated and deposited thereon, and a second information layer 4s made up of a second information pit 2s formed on a surface of a second light transmission substrate is and a semi-transparent reflection film 3s coated and deposited thereon are bonded in such a way that an opposite side surface of a side where the first information layer 4f of the first light transmission substrate 1f is formed and a surface on a side where the second information layer 4s of the second light transmission substrate 1s is formed are bonded with a transparent adhesive 5.

Then, as a first reproduction light Lf, a laser light with a wavelength range of 770 nm~830 nm of the reproduction light (hereafter, referred to as a first wavelength) in the playback player of the conventional general purpose, for example, reproduction-only compact disk (CD), is radiated from a rear side of the second light transmission substrate 1s to carry out the reproduction of the information from the first information layer 4f and as a second reproduction light Ls, a laser light shorter in wavelength than the former and a wavelength range of 615 nm~655 nm of a semi-conductor laser capable of being mass produced (hereafter, referred to as a second wavelength), is radiated to focus on the second information layer 4s, whereby the reproduction of the information from the second information layer 4s is carried out.

In order to obtain a reproduction signal of a high quality from the first information layer 4f by using such the optical disk, (i) a reflection factor Rf1 of the metal reflecting film 3f against the first reproduction light Lf by the first wavelength must be high, (ii) a transmission factor Ts1 of the second information layer 4s relative to the light with the first wavelength must be as high as possible, that is, a light absorption factor As1 relative to the light with the first wavelength must be as low as possible, as well as its refection factor Rs1 against the light with the first wavelength must be as small as possible.

Also, in order to obtain a reproduction signal of a high quality from the second information layer 4s, (iii) a reflection factor $R_{s2}$ of the semi-transparent film 3s against the second reproduction light with the second wavelength must be high.

(iv) Therefore, from the above mentioned items (ii) and (iii), it is desirous that the semi-transparent reflecting film 3s of the second information layer 4s has a characteristic to the extent that Rs2−Rs1 is as large as possible ($Rs_2$ is as larger than $Rs_1$ as possible).

As a material to form the semi-transparent reflecting film 3s of the second information layer 4s, employment of silicon (Si) and a multi-layer structure with a dielectric substance are proposed.

As described in the above mentioned item (ii), because it is demanded that the light absorption factor of the light with the first wavelength is as small as possible, when the silicon is used, it is desirous that the silicon forms itself into a film as a thin film having excellent crystallization, but, due to a problem of thermal stability of the plastic substrate, there is some restrictions to forming the Si into the film having an excellent film quality on the light transmission substrate, particularly, a plastic substrate made up of poly-carbonate (PC) and the like, which is excellent in terms of mass productivity, costs and the like.

Also, when the dielectric substance is used for the multi-layer film structure, there is a problem that a process for manufacture becomes very complicated as compared with forming of a single layer film, thereby bringing a problem about high costs.

Also, as for the light transmission substrate, it is formed mainly of the poly-carbonate (PC) in consideration of a price, reliability, mass productivity and the like. In the case, however, there is a problem that double refraction is considerably large in comparison with glass. The double refraction is known to concentrate mainly on a very thin surface layer (a portion of nearly several ten μm in thickness) of the substrate, but not dependent on the thickness of the substrate. Therefore, the problem of the double refraction does not depend on the thickness of the substrate but on how many times the target reproduction light passes through the surface thereof, and so, when two sheets of the light transmission substrates 1s and 1f as shown in FIG. 1, are used, the reproduction light for the first information layer 3f passes through the surface layers of both the two sheets of the light transmission substrates is and 1f and an influence of the double refraction becomes two times as much as a case of a single layer.

By the way, in order to be able to obtain a reproduction signal of a high quality in such the optical disk, it is desirable that the reflection factor against the light with the first wavelength is made more than 60%. This value can be made one index to obtain a high reproduction signal by a normalized value in a general purpose compact disk CD. Also, it is desirable that the reflection factor against the light with the second wavelength is 15%~30%. This value can be made one index to obtain the reproduction signal of a high quality by a normalized value in a two layer disk of a so-called DVD (Digital Versatile Disk)

SUMMARY OF THE INVENTION

It is an object of the present invention to insure that the reproduction of a higher quality can be carried out in the above mentioned multi-layer disk in which the above-mentioned first and second information layers are laminated.

A multi-layer optical disk according to the present invention has such a structure that a first information layer and a second information layer are piled up to form one sheet of an optical disk. Then, the first information layer has a metal reflecting film whose reflection factor relative to a first reproduction light with a wavelength range of 770 nm~830 nm (a first wavelength) is over 60% and the second information layer is so structured to have a semi-transparent reflection film wherein a ratio of $ns_2/ns_1$ between respective real numbers of a refractive index $ns_1$ relative to the above mentioned first reproduction light and a refractive index $ns_2$ relative to a second light with a wavelength range of 615 nm~655 nm (a second wavelength) is over 1.05.

Alternatively, the second information layer is to be so structured to have a semi-transparent reflecting film wherein an imaginary number of the refractive index relative to the above mentioned first reproduction light is less than 0.05.

The optical disk having the above mentioned structure according to the present invention, can carry out a reproduction of a high quality concerning the first and the second information layers by the first and the second reproduction lights, and concerning the first information layer, is made to be able to carry out the high quality reproduction even by a general purpose CD player.

DESCRIPTION OF THE PREFERRED EMBODIMENTS

A multi-layer optical disk according to the present invention is so structured that a first information layer and a second information layer are piled up to form one sheet of an optical disk.

Figure 1:
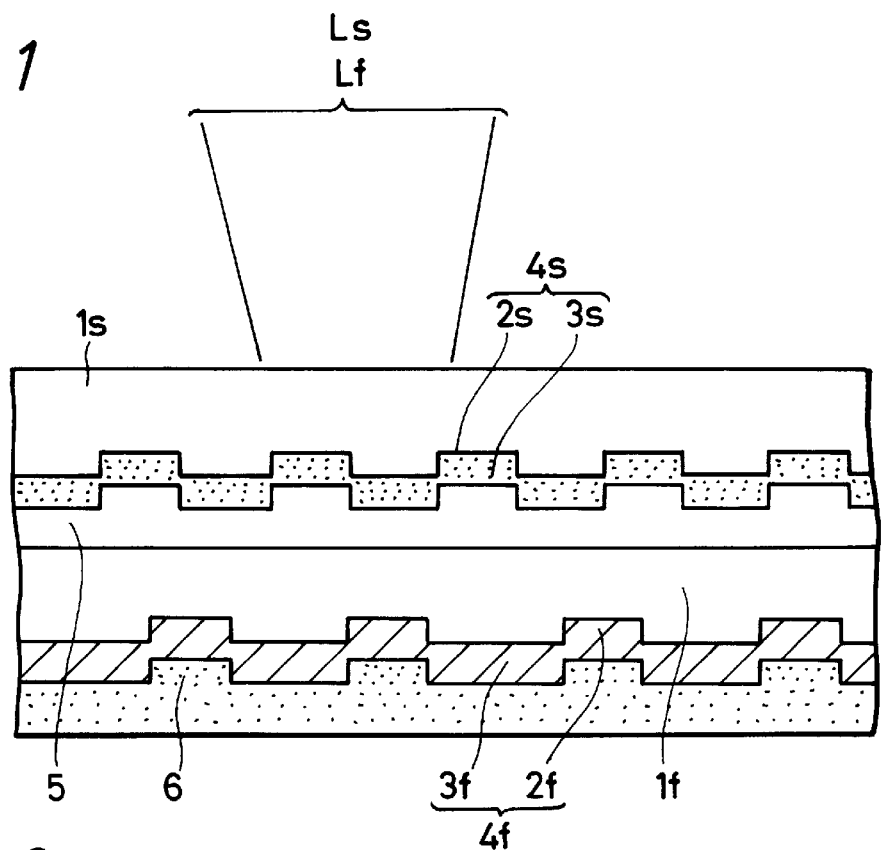
FIG. 1 is a schematic cross-sectional view of one example of a multi-layer optical disk according to the present invention as well as a conventional multi-layer optical disk.

The optical disk can be, as shown in FIG. 1, so structured that a first and a second light transmission substrates 1f and 1s on which a first and a second information layers 2f and 2s are respectively formed are piled up and bonded together with a transparent adhesive 5.

The first and the second light transmission substrates 1f and 1s are respectively molded by an injection molding using plastic such as, for example, polycarbonate (PC) or the like, and concurrent with the molding, information pits 4f and 4s of the first and the second information layers 4f and 4s are transferred to and molded on respective main surfaces of the substrate 1f and 1s by stampers, for example, nickel stampers which are disposed in a cavity of a molding die and the other main surfaces thereof are formed as smooth surfaces respectively.

Alternatively, the first and the second transmission substrates 1f and 1s are formed from plastic such as PC and the like or glass as smooth substrates, and the information pits 2f and 2s can be formed on the respective main surfaces thereof by means of painting of, for example, ultra-violet curing resin, pressing of the stampers and curing treatment, that is, a 2P method (Photopolymerization).

The first and the second light transmission substrates 1f and 1s are structured as substrates whose double-refraction is less than 50 nm by selecting a temperature of the die, a pressure, a time for sustaining the pressure and the like at a time of the injection molding.

Then, the first information layer 4f is formed by depositing a metal reflecting film 3s by means of vapor deposition, sputtering and the like on the whole surface on which the first information pit 2f of the first light transmission substrate 1f is formed. Also, a protective layer 6 is formed covering wholly the first information layer 4f.

A semi-transparent reflecting film 3s is deposited wholly on a surface of the second light transmission substrate 1s on which the second information pit 2s is formed, thereby forming the second information layer 4s.

The multi-layer optical disk is so structured that the surface of the first light transmission substrate 1f opposite to a side where the first information layer 4f is formed and the surface of the second light transmission substrate 1s on the side where the second information layer 4s is formed are bonded together with a transparent adhesive 5 such as, for example, ultra-violet rays curing resin.

In this structure, summation of the thicknesses of the first and the second light transmission substrates 1f and 1s is selected to become 1.1~1.3 mm. For example, it is desirable that the whole thickness is set to 1.25 mm on the premise that each of thicknesses of the first and the second light transmission substrates 1f and is 1s made to be 0.6 mm and the thickness of the transparent adhesive 5 is 0.05 mm.

Read-out, that is, the reading or reproduction of the information from the first information layer 4f of the multi-layer optical disk according to the present invention is carried out in such a manner that, as shown in FIG. 1, a first reproduction light Lf with a first wavelength, for example, a semi-conductor laser light of the reproduction light in a conventional general purpose, for example, reproduction-only CD player which has a wavelength range of 770 nm~830 nm is irradiated from the rear side of the second light transmission substrate 1s, and the reflecting light from the metal reflecting film 3f is detected.

Also, the reproduction of the information from the second information layer 4s is carried out in such a way that a second reproduction light LS with a second wavelength, that is, a semi-conductor laser light with a wavelength of 615 nm~655 nm is similarly focused on the second information layer 4s from the rear side of the second light transmission substrate 1s, and the reflecting light therefrom is deleted to thereby obtain a reproduction signal Then, particularly, according to the present invention, the metal reflecting film 3f constituting the first information layer 4f is formed of a metal reflecting film which has a reflection factor of more than 60% relative to the first reproduction light with the wavelength range of 770 nm~830 n m.

The metals constituting the metal reflecting film 3f is formed by vapor deposition, sputtering and the like of a metal, for example, Au, Ag, Cu of an alloy thereof. A film thickness of the metal reflecting film 3f is to be set to more than 50 nm to be able to surely obtain a high reflection factor or preferably to more than 70 nm.

The protective film 6 formed on the metal reflecting film 3f can be structured by painting and curing the ultra-violet ray curing resin.

The semi-transparent reflecting film 3s constituting the second information layer 4s is high in its transmission factor $Ts_1$ for the light with the first wavelength, that is, is small in its light absorption factor $As_1$, of the light with the first wavelength, and is small in its reflection factor $Rs_1$ against the light with the first wavelength and also, makes a reflecting factor $Rs_2$ against the second reproduction light Ls with the second wavelength, that is, $Rs_2-Rs_1$ larger. To be more specific, in a thin film, the larger a refractive index is, the larger the reflection factor becomes and the smaller the refractive index is, the smaller the reflection factor becomes. Therefore, when the refractive indexes of the semi-transparent reflecting film 3s against the lights with the first and the second wavelengths are set to $ns_1$ and $ns_2$, $ns_2/ns_1$ is made large, particularly, a ratio between respective real number portions of the refractive index $ns_1$ and refractive index $ns_2$ or $ns_2/ns_1$ is set to more than 1.05.

Also, the semi-transparent reflecting film 3s is formed of a semi-transparent reflecting film material whose imaginary number portion of the refractive index against the first reproduction light is less than 0.05.

The semi-transparent reflecting film 3s is formed as a single-layer structure of a amorphous film made up of a single material of amorphous SiH, amorphous SiO, amorphous SiN, or a mixed material of more than two of them and amorphous Si, for example, Si (HO), Si (HNO).

Also, the semi-transparent reflecting film 3s can be formed with an amorphous film made up of Ge, amorphous Ge, amorphous GeH, amorphous GeO, amorphous GeN, or a mixed material of more than two of them, for example, Ge (HNO), an amorphous film made up of amorphous SiGe, amorphous SiGeH, amorphous SiGeO, amorphous SiGeN, or a mixed materials of more than two of them such as SiGe (HON), or amorphous film made up of amorphous Sic, amorphous SiCH, amorphous SiCO, amorphous SiCN, or a mixed materia of more than two of them such as SiC (HON).

Also, the thickness of the semi-transparent reflecting film 3s is set to be less than 22 nm, that is, preferably formed in a zone 1 on a side wherein the thickness of the film is small, and wherein a film thickness allowance value capable of obtaining a required reflection factor can be obtained with respect to film thickness dependency of a spectral characteristic to be described later Nextly, an embodiment of the semi-transparent reflecting film 3s will be described. The semi-transparent reflecting film 3s is formed as an amorphous Si (hereafter, inscribed as a-Si) film by means of sputtering or vacuum evaporation using, for example, crystal silicon (Si) or polycrystal silicon as a raw material, and oxygen or hydrogen is mixed therewith when the film is formed.

For example, in the case of the vacuum evaporation, after an inside of a vacuum chamber wherein the vacuum evaporation is to be carried out is made to become a high degree of a vacuum state in an extent of reaching, for example, $10^{-4}$ Pa order, a small amount of oxygen or hydrogen or both of them are introduced into a vacuum chamber, and the vacuum evaporation is carried out on a surface of the second light transmission substrate 1s on which the second information pit 2s is formed, thereby forming a target semi-transparent reflecting film 3s.

Also, in the case of the sputtering, similarly, a small amount of oxygen or hydrogen or both of them other than inert gases such as Ar and the like are introduced into the inside of the chamber in which the sputtering is performed to carry out a so-called reactive sputtering, thereby forming a target semi-transparent reflecting film 3s.

Meanwhile, it is well known that after Si completely reacts with oxygen or hydrogen there is produced $SiO_2$ or $SiH_4$, but in the formation of the semi-transparent reflecting film 3s according to the present invention, such the complete reaction is not carried out, but that there is provided a structure in which oxygen and hydrogen are made to be bonded to a so-called dangling bond wherein the Si atom itself is not in a state of covalent linkage, to suppress the absorption of the light, and as for addition of oxygen and hydrogen to that end, a ratio of oxygen and hydrogen to the Si atom is selected to be as much as 2~30 atom percent.

The first and the second light transmission substrates 1f and 1s wherein the first and the second information layers 4f and 4s are respectively formed in this manner are formed in such a manner that a surface of the first light transmission substrate 1f on an opposite side to a side where the first information layer 4f is formed and a surface of the second light transmission substrate on a side where the second information layer 4s is formed are bonded with the transparent adhesive 5.

The bonding with the transparent adhesive 5 is carried out in a way that the transparent adhesive 5 made of liquid ultra-violet curing resin is painted on, for example, the semi-transparent reflecting film 3s, both the substrates 1f and is are laminated with a predetermined positional relationship therebetween, and radiation of the ultra-violet rays is conducted to cure the transparent adhesive 5 to thereby bone the substrates 1f and 1s.

Next, consideration will be given to an optical characteristic of the semi-transparent reflecting film 3s.

In this case, on respective main surfaces like a mirror surface with neither concave nor convex spots of respective PC substrates, amorphous SiO (a-SiO), amorphous SiH (a-SiH), amorphous SiHO (a-SiHO) according to the structure of the present invention, and further, amorphous Si and crystal Si (a-Si) for comparison'sake, are respectively made to form a film each, and respective test samples, by painting on them a protective layer as thick as 30 $\mu$m from the ultra-violet curing resin used for bonding with the above mentioned other substrate, have been manufactured. Also, in the test samples, by forming respective films in a range of 10 nm~100 nm of thickness, double refraction indexes have been obtained in cases of a wavelength of 780 nm and of a wavelength of 650 nm by the measurement of a film width, a light transmission factor and a reflection factor thereof. Results thereof will be shown in a table 1 described below. Meanwhile, in the table 1, although an illustration is made of the crystal Si as an example for comparison, the values thereof are quoted from those of literature. Also, in the table 1, ratios $n_2/n_1$ between real number portions of refractive indexes of respective test samples are jointly illustrated.

TABLE 1

| formed film material | refractive indexes (780 nm) $n_1 + ik_1$ | refractive indexes (650 nm) $n_2 + ik_2$ | ratios between refractive indexes ($n_2/n_1$) |
|---|---|---|---|
| a - SiO | 3.55 ± i0.04 | 3.75 ± i0.15 | 1.056 |
| a - SiH | 4.05 ± i0.05 | 4.43 ± i0.26 | 1.094 |
| a - SiHO | 3.13 ± i0.01 | 3.33 ± i0.03 | 1.064 |
| a - Si | 3.70 ± i0.08 | 3.86 ± i0.34 | 1.043 |
| CRYSTAL Si | 3.71 ± i0.007 | 3.85 ± i0.016 | 1.038 |

Figure 2:
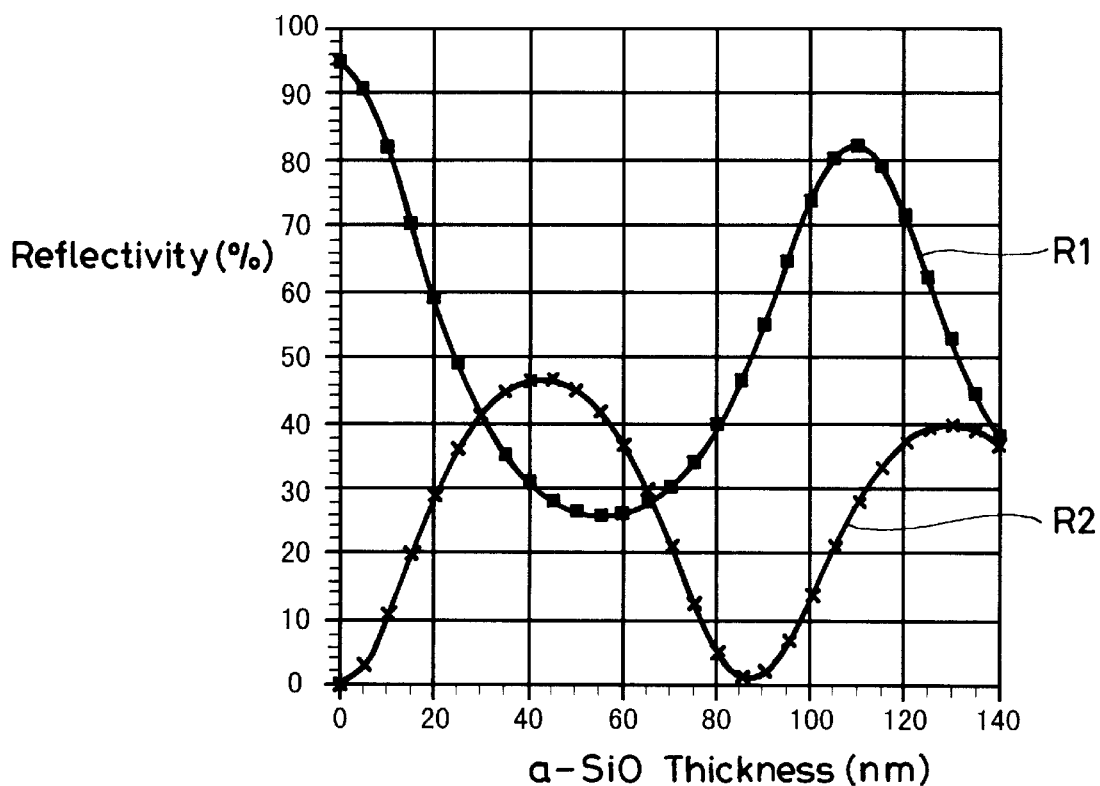
FIG. 2 is a graph showing wavelength dependency of a reflection factor of amorphous SiO to be used for explaining a structure of a semi-transparent reflection film of a multi-layer optical disk according to the present invention.
Figure 3:
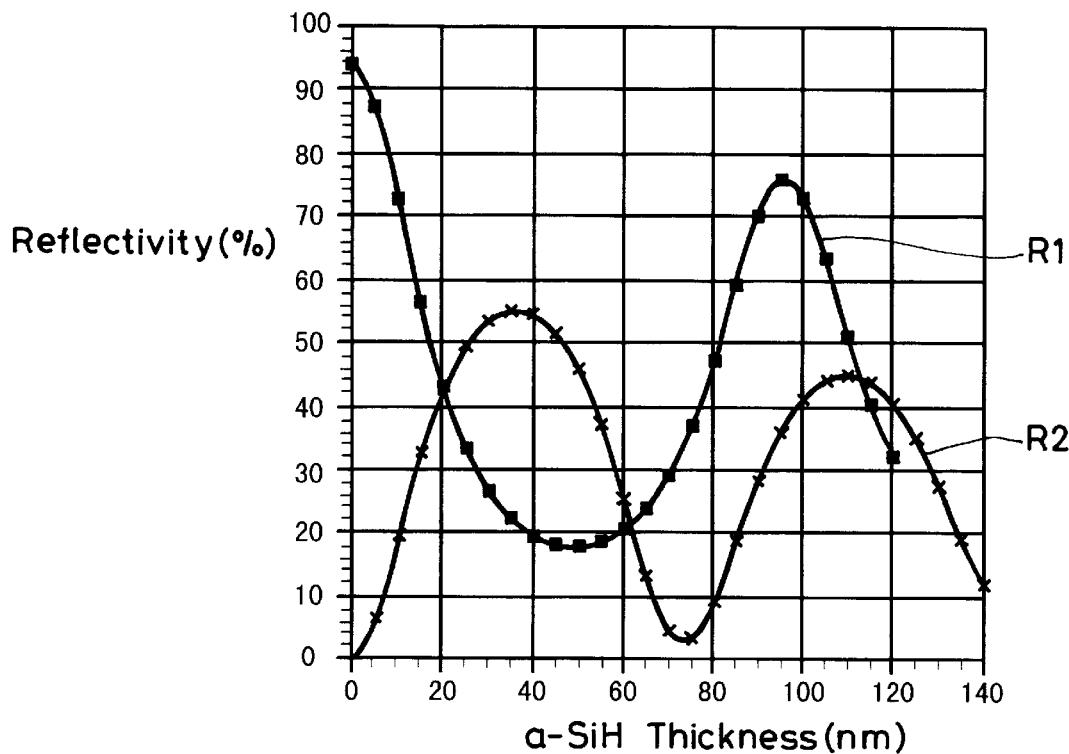
FIG. 3 is a graph showing wavelength dependency of a reflection factor of amorphous SiH to be used for explaining the structure of the semi-transparent reflection film of the multilayer optical disk according to the present invention.
Figure 4:
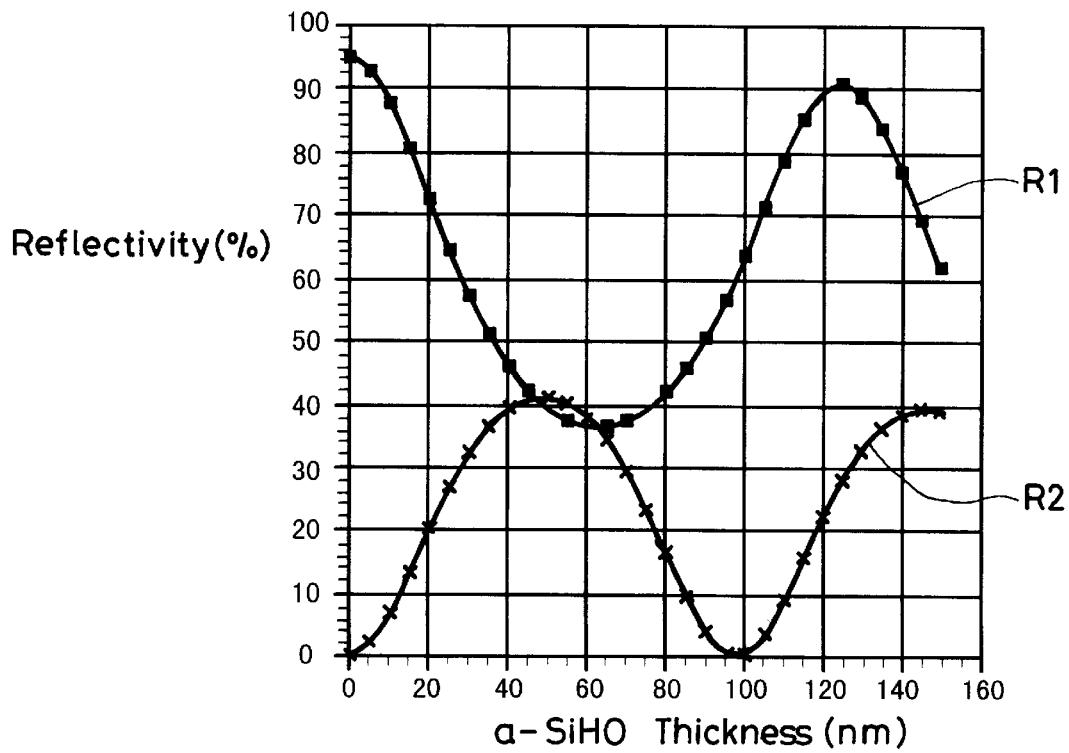
FIG. 4 is a graph showing wavelength dependency of a reflection factor of amorphous SiHO to be used for explaining the structure of the semi-transparent reflection film of the multi-layer optical disk according to the present invention.
Figure 5:
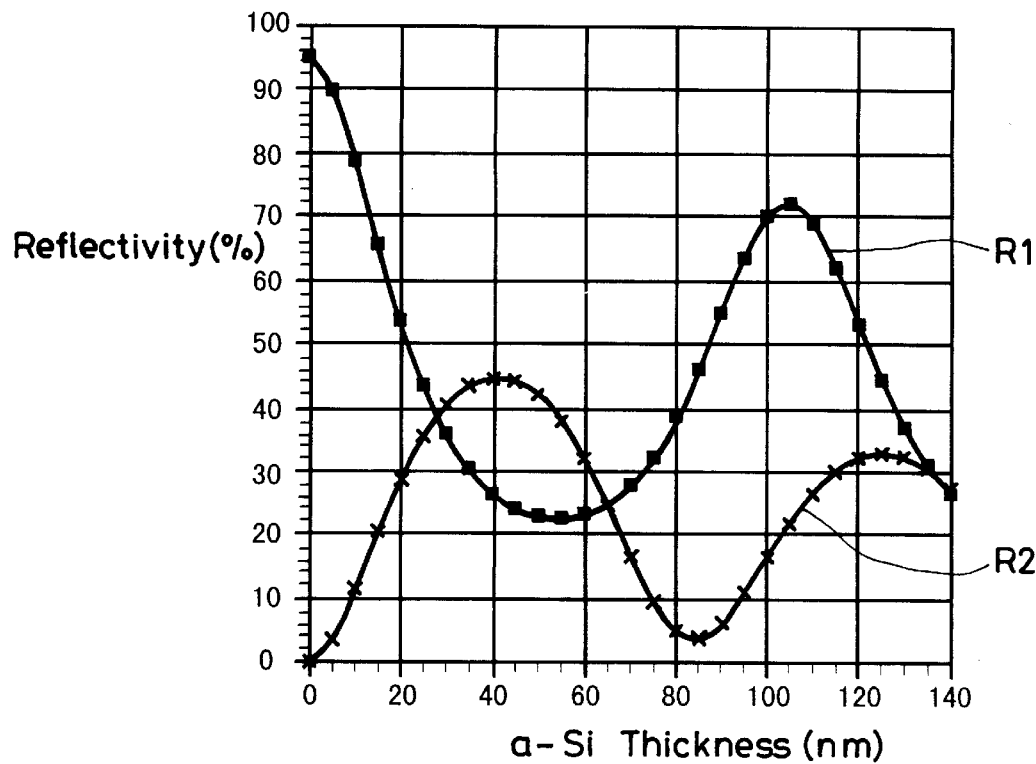
FIG. 5 is a chart showing wavelength dependency of a reflection factor of amorphous Si to be used for explaining the structure of the semi-transparent reflection film of the multi-layer optical disk according to the present invention.

By using the refractive indexes based on the table 1, a reflection factor $R_1$ of the first information layer relative to the wavelength of 780 nm and a reflection factor $R_2$ of the second information layer relative to the wavelength of 650 nm in case where the respectively film forming materials are made a semi-transparent reflection film of the second information layer, are obtained by means of calculation. In the case, on the assumption that the metal reflection film 3f of the first information layer 4f is so structured as to be formed of an Au film of 100 nm in thickness, the reflection factor on an interface between the first light transmission substrate 1f and the metal reflecting film 3f is set to 95%. Film thickness dependency of the spectroscopic characteristic by calculation about each of the samples is respectively shown in FIGS. 2 through 6. That is, FIG. 2 is a case of a-SiO, FIG. 3 is a case of a-SiH, FIG. 4 is a case of a-SiHO, FIG. 5 is a case of a-Si not including oxygen and hydrogen, and FIG. 6 is a case of crystal Si.

Figure 6:
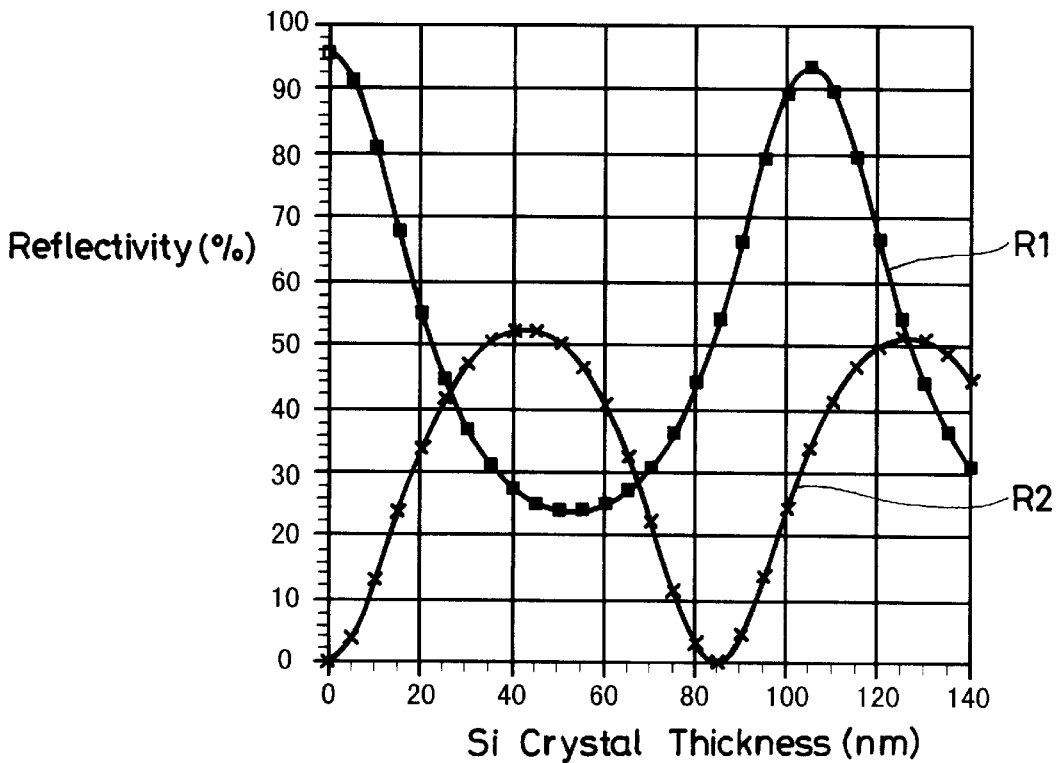
FIG. 6 is a chart showing wavelength dependency of a reflection factor of crystal Si to be used for explaining the structure of the semi-transparent reflection film of the multi-layer optical disk according to the present invention.

In the case of crystal Si of FIG. 6, as the film thickness becomes thicker thereof from 0 on, the reflecting factor R1 decreases while R2 increases. Then, in the neighborhood of 13 nm in thickness, $R_1$ becomes larger than 70% (R1>70%), and at the same time, $R_2$ becomes larger than 18% (R2>18%) (hereafter, the thickness zone is referred to as a zone 1), which satisfies the index mentioned in the beginning, thereby leading to acquisition of an excellent reproduction signal. Then, when the film thickness further increases, again, in the neighborhood of 130 nm, the above mentioned condition is in place that is $R_1$ is larger than 70% and at the same time, $R_2$ is larger than 18% (hereafter, the thickness zone is referred to as a zone 2). Then, the increase and decrease are kept on repeating, but it is preferable that a zone more thicker than the second zone is practically avoided on account of a problem accompanying manufacture. Therefore, a range between the upper limit and the lower limit of the film thickness, wherein the required reflection factor, or $R_1$>70% and at the same time, $R_2$>18% can be obtained in the zone 1 and the zone 2 of respective single layer materials, is shown, together with a rate from a center being shown in a parenthesis as a film thickness allowance value [%].

TABLE 2

| single layer film material | zone 1 | zone 2 |
|---|---|---|
| a - SiO | 13.9~15.1 nm(±3.8%) | 102.9~121.1 nm(±8.1%) |
| a - SiH | 9.5~11.1 nm(±7.8%) | 87.8~104.2 nm(±8.5%) |
| a - SiHO | 18.3~21.8 nm(±8.7%) | 116.7~144.9 nm(±10.8%) |
| a - Si | 13.6~14.5 nm(±3.2%) | 101.5~109.4 nm(±3.7%) |
| CRYSTAL Si | 12.5~14.0 nm(±5.7%) | 97.1~118.6 nm(±10.0%) |

In the case, a desired allowance value from a practical viewpoint is ± about 5%, from which it is understood that a-SiH, a-SiHO and further, the crystal Si are preferably used. However, as described in the beginning, crystal Si is not practical because it is difficult for the crystal Si to form a film on the light transmission substrate. Also, a practical allowance value of a film thickness of a-Si in FIG. 5 is, as apparent when compared with FIG. 6, comparatively small because its light absorption becomes larger compared with the crystal Si. In contrast to this, in the case of a-SiO mixed with oxygen, the light absorption becomes smaller at 780 nm compared with a-Si, and $n_2/n_1$ becomes larger, so the reflection factor $R_1$ in the zone 2 becomes higher, and as a result, the allowance value of the film thickness in the zone 2 indicates a higher value than ±5%. Similarly, in the case of a-SiH mixed with hydrogen, because the light absorption decreases and $n_2/n_1$ becomes larger as compared with the oxygen mixed therewith, an enough film thickness allowance value has been obtained even in the zone 1. Then, the fact that the enough film thickness allowance value is obtained even in the zone 1 wherein the film thickness is small, makes it possible to form the semi-transparent reflecting film 3s in the zone 1 of a small film thickness, with the result of large practical merits coming from reduction in time of forming the film and the like. Further, according to a-SiHO mixed with both oxygen and hydrogen, there is a further decrease in the light absorption, so the film thickness allowance value is further expanded in the zone 1 as well as in the zone 2, thereby adding to profitability in terms of production.

As realized from the table 1 and the table 2, a value of the imaginary number portion of the refractive index indicating the light absorption on the part of the semitransparent reflecting film 3s constituting the second information layer 4s is preferably less than 0.05 at 780 nm. Also, it is understood that a ratio $n_2/n_1$ between the real number portions of the refractive indexes, that is, $ns_1/ns_2$ as the second information layer 4s is preferably more than 1.05.

Then, in this connection, when the metal reflecting film 3f of the first information layer 4f is made of, for example, Al as in the conventional case, $R_1$ values of films in the respective materials become values obtained by multiplying the $R_1$ values in FIG. 2 through FIG. 6 and a ratio of an Al's reflecting factor 81% against the wavelength of 780 nm to an Au's similar reflecting factor 95%, that is, 0.85. That is, in the case of an Al' reflecting film, as $R_1$ becomes lower by 15% compared with an Au' film, the film thickness allowance value can not be made larger.

Meanwhile, the above mentioned examples are cases wherein the semi-transparent reflecting film 3s of the second information layer 4s is formed of composing materials introducing oxygen or hydrogen or both of them in the a-Si system, but the same effects can be obtained by forming the same of such composing materials introducing above mentioned Ge, SiGe or a-Ge system or a-SiGe system, similarly introduced with either oxygen or hydrogen or the both.

As mentioned above, according to the present invention, by specifying respective optical characteristics of the metal reflecting film 3f of the first information layer 4f and the semi-transparent reflecting film 3s constituting the second information layer 4s, the second reproduction light with the second wavelength for the second information layer 4s is led by with 18% which is as an index, so a reproduction light of an excellent quality can be obtained and at the same time, by making the first reproduction light with the first wavelength penetrate the second information layer 4s sufficiently and further, by making the metal reflecting film have more than 90% of the reflection factor, the first reproduction light heading for the first information layer 4f can be led to reflect with amply high efficiency although the first reproduction light decreases to some extent in the second information layer 3s. So, the reproduction signal excellent in quality can be obtained as to the reproduction by the first reproduction light of the information from the first information layer 4f.

Then, as the first reproduction light with the first wavelength is in a range of 770 nm~830 nm in wavelength, a general purpose CD player, for example, can be used. That is, the reproduction of the first information layer 4f is made possible.

Also, in the structure of FIG. 1, the first reproduction light for the first information layer 4f passes through the surfaces of the first and the second light transmission substrates 1f and 1s four times, but, as mentioned above, because the double refraction thereof is set to less than 50 nm, an equal value reproduction signal that bears comparison with the double refraction value of 100 nm in the conventional CD and DVD can be obtained.

Also, the above mentioned example is a case wherein two sheets of the light transmission substrates are used, but there are some cases not limited to the example as shown in the drawing, thereby making various alterations of forms possible, in which the pits of the first and the second information layers are formed on one sheet of the light transmission substrate is by means of the two-p method, or the pit of one information layer is simultaneously formed when injection molding of the light transmission substrate is carried out while the pit of the other information layer is formed by means of the two-p method. Also, in the structure of FIG. 1, the recording density of the second information layer 4s is higher than that of the first information layer 4f.

As mentioned above, according to the present invention, by specifying the respective optical characteristics of the metal reflecting film 3f of the first information layer 4f and the semi-transparent reflecting film 3s constituting the second information layer 4s, the second reproduction light with the second wavelength for the second information layer 4s is led by a reflecting factor set as an index of more than 18%, so a reproduction light of an excellent quality can be obtained and at the same time, by making the first reproduction light with the first wavelength sufficiently penetrate the second information layer 4s and further, by making the metal reflecting film have more than 90% of the reflection factor, the first reproduction light heading for the first information layer 4f can be led to reflect with enough high efficiency although the first reproduction light decreases to some extent in the second information layer 3s. So, the reproduction signal excellent in quality can be obtained as to the reproduction by the first reproduction light of the information from the first information layer 4f.

Then as the first reproduction light with the first wavelength is in a range of 770 nm 830 nm in wavelength, a general purpose CD player, for example, can be used. That is, the reproduction of the first information layer 4f is made possible thereby.

Also, in the structure of FIG. 1, the first reproduction light for the first information layer 4f passes through the surfaces of the first and the second light transmission substrates 1f and 1s four times, but, as mentioned above, because the double refraction thereof is set to less than 50 nm, an equal value reproduction signal that bears comparison with the double refraction value of 100 nm in the conventional CD and DVD can be obtained.

Also, in the structure according to the present invention, as the second information layer 4s is made of a single layer film, when compared with a case of employing a structure in which dielectric substance films are laminated in multi-layers, simplification of the designing and production of the information layer, accordingly, improvement of productivity can be implemented.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A multi-layer optical disk in which a first information layer and a second information layer are laminated to form one sheet of an optical disk, comprising;

a metal reflecting film formed in said first information layer and having a reflection factor of more than 90% relative to a first reproduction light with a wavelength range of 770 nm~830 nm, and a semi-transparent reflecting film formed in said second information layer film wherein a ratio $ns_2/ns_1$ between respective real number portions of a refractive index $ns_1$ relative to said first reproduction light and a refractive index $ns_2$ relative to a second reproduction light with a wavelength range of 615 nm~655 nm is more than 1.05.

2. A multi-layer optical disk in which a first information layer and a second information layer are laminated to form one sheet of an optical disk, comprising;

a metal reflecting film formed in said first information layer and having a reflection factor of more than 90% relative to a first reproduction light with a wavelength range of 780 nm~820 nm, and a semi-transparent reflecting film formed in said second information layer and having an imaginary number portion of a refractive index relative to said first reproduction light of less than 0.05.

3. A multi-layer optical disk as claimed in claim 1, wherein an imaginary number portion of the refractive index of said semi-transparent reflecting film relative to said first reproduction light is less than 0.05.

4. A multi-layer optical disk as claimed in claim 1, wherein said semi-transparent reflecting film is formed of an amorphous film made up of a single material of each of amorphous SiH, amorphous SiO and amorphous SiN, or a mixed material of more than two of them plus amorphous Si.

5. A multi-layer optical disk as claimed in claim 2, wherein said semi-transparent reflecting film is formed of an amorphous film made up of a single material of each of amorphous SiH, amorphous SiO and amorphous SiN, or a mixed material of more than two of them plus amorphous Si.

6. A multi-layer optical disk as claimed in claim 3, wherein said semi-transparent reflecting film is made of an amorphous film made up of a single material of each of amorphous SiH, amorphous SiO and amorphous SiN, or a mixed material of more than two of them plus amorphous Si.

7. A multi-layer optical disk as claimed in claim 1, wherein a film thickness of said semi-transparent reflecting film is set to less than 22 nm.

8. A multi-layer optical disk as claimed in claim 2, wherein a film thickness of said semi-transparent reflecting film is set to less than 22 nm.

9. A multi-layer optical disk as claimed in claim 3, wherein a film thickness of said semi-transparent reflecting film is set to less than 22 nm.

10. A multi-layer optical disk as claimed in claim 1, wherein a first plastic substrate having said first information layer and a second plastic substrate having said second information layer are bonded together with a transparent adhesive, and respective double refractions of said first and second substrates are made less than 50 nm.

11. A multi-layer optical disk as claimed in claim 2, wherein a first plastic substrate having said first information layer and a second plastic substrate having said second information layer are bonded together with a transparent adhesive, and respective double refractions of said first and second substrates are made less than 50 nm.

12. A multi-layer optical disk as claimed in claim 3, wherein a first plastic substrate having said first information layer and a second plastic substrate having said second information layer are bonded together with a transparent adhesive, and respective double refractions of said first and second substrates are made less than 50 nm.

* * * * *